Patented Mar. 17, 1936

2,033,978

UNITED STATES PATENT OFFICE 2,033,978

CONCENTRATION OF LOWER ALIPHATIC ACIDS

Henry Dreyfus, London, England

No Drawing. Application March 18, 1933, Serial No. 661,566. In Great Britain April 1, 1932

19 Claims. (Cl. 260—122)

This invention relates to the concentration of aqueous solutions of lower aliphatic acids, and in particular to the production of concentrated acetic acid from dilute acetic acid, especially dilute acid such as is obtained as a by-product in the acetylation of cellulose and in other acetylation processes.

It is well known that concentrated acetic acid may be produced from the dilute aqueous acid by extraction with solvents, for example ether, ethyl acetate and the like. Unfortunately, however, many of those substances which exhibit a good power of extracting acetic acid from its dilute aqueous solutions are at the same time solvents for water. In consequence the extract contains appreciable quantities of water, sufficient in fact to cause the extracted acid to be far below 100 per cent. strength. Thus the extraction of 30 per cent. acetic acid with ether followed by distillation of the extract generally results in an acid of about 70 per cent. strength. A very marked improvement as regards the strength of the acid obtained may be effected in the manner described in U. S. Patent No. 1,696,432. According to that specification the extracting agent consists of a solvent such as ether, ethyl acetate or the like, together with a hydrocarbon. By the use of mixtures of this character, substantially anhydrous acid may be obtained by simple extraction and distillation. Further, in my prior U. S. application Serial No. 470,233 filed 23rd July, 1930, now Patent No. 1,952,845, dated March 27, 1934, I have described another method of producing concentrated acetic and other acids from the dilute acids by extraction processes. The process of that specification comprises extracting the dilute acid with the ether or other solvent and thereafter adding a substance, particularly a hydrocarbon, adapted to precipitate any water contained in the extract.

I have now found that in the extraction of acetic acid from its aqueous solution by means of solvents, particularly low boiling solvents, e. g. ethers or esters, the value of the latter for the extraction process may be materially increased by the presence of oxygen containing compounds which are substantially insoluble in water, and in which water is substantially insoluble. Such oxygen-containing compounds are particularly ketones, ethers and esters. By the addition of these compounds to the ether, ethyl acetate or other solvent, a diminution of the proportion of water extracted simultaneously with the acid may be secured without a corresponding material diminution in the acid extracting power of the solvent. The proportion of the oxygen-containing compound may be small relative to that of the ether or other solvent.

According to the present invention therefore the production of concentrated acetic or other lower aliphatic acids from their dilute aqueous solutions is effected by a process comprising extraction with a mixture of a solvent, particularly a low boiling solvent, and an oxygen-containing compound which is substantially immiscible with water, i. e. which is substantially insoluble in water and in which water does not dissolve to any material extent. Particularly good results may be obtained by the use as solvents of liquids such that the partition coefficient of acetic acid between the said liquid and water is relatively high, especially when the ratio of acid to water is low.

The invention is of particular value in connection with the production of concentrated acetic acid from dilute acid of 10–40 per cent. strength such as is obtained as a by-product in many chemical processes.

As examples of solvents which may with advantage be employed in accordance with the present invention, mention may be made of those of boiling point sufficiently low to enable their easy separation from the acid to be obtained in concentrated form, for example ethers, e. g. diethyl ether or di-isopropyl ether, or esters, e. g. ethyl acetate, ethyl butyrate or butyl formate, or ethyl-methyl-ketone, e. g. in the form of acetone oils.

The oxygen-containing compounds employed in conjunction with the solvents may very advantageously be ketones, ethers or esters, possessing the desired low solvent power for water. They may possess boiling points similar to that of the solvents or higher or lower boiling points. Particularly good results may be obtained by means of compounds of relatively high boiling point, for example of boiling point above about 140° C. when used in admixture with solvents of relatively low boiling point. The esters may be for instance those of mono-, di- or polybasic acids or of mono-, di or polyhydric alcohols. Thus, aliphatic acid esters may be employed, especially those containing more than about five or six carbon atoms, e. g. amyl acetate, octyl acetate, butyl butyrate, or other wholly aliphatic esters, or benzyl acetate or other esters containing aromatic nuclei. Again, esters of aromatic or hydroaromatic acids with aliphatic or other alcohols may be employed, for example dimethyl, diethyl or dibutyl phthalate, or ethyl or benzyl benzoate, glycol dibenzoate or other benzoic esters, and ethyl naphthenate or other hydro-aromatic acid esters. As examples of suitable ketones mention may be made of aceto-phenone and other alkyl aryl ketones. As examples of suitable ethers there may be mentioned the alkyl or other ethers of phenols, for example anisole, phenetole, benzyl phenyl ether, and the corresponding alkyl ethers of other phenols, naphthols or hydroxy compounds of the aromatic series.

The proportion of oxygen-containing compound to solvent employed will vary according to the nature of the compounds in question and the acid to be obtained in concentrated form. For example when concentrating acetic acid of 20 to 40 per cent. strength a mixture of about 60–80 per cent. of ether or ethyl acetate with 40 to 20 per cent. of one of the above mentioned oxygen-containing compounds, for example phenetole or other alkyl-aryl-ether may be used.

The extraction of the aqueous aliphatic acid may be carried out in any desired manner, for example by thorough mixing of the acid and the extraction medium and then allowed to separate into layers. Again, the extraction may be effected in a column using the counter-current principle, in which case the column may, if desired, contain suitable packing material. If, as is usually the case, the extracting medium is of lower specific gravity than the aqueous acid, the latter will be introduced at the top of the column and the extracting medium at the bottom.

According to a modification of the invention the dilute acid may if desired first be extracted with the solvent alone, the oxygen-containing compound then being added to the extract in order to precipitate water after the manner described in the previously mentioned U. S. application Serial No. 470,233 filed July 23, 1930.

Concentrated acid may be isolated from the extract in any desired manner, but in general most conveniently by distillation. Where the solvent and added substance are of substantially the same boiling point their removal by distillation may conveniently be effected in a single operation, the mixture being returned to the extraction apparatus for further use. Where however the components of the extracting medium have widely different boiling points, and particularly where one is of higher and one is of lower boiling point than the acid to be obtained in concentrated form, two distillation operations may be advisable. Thus, where the extracting agent comprises a mixture of a low boiling solvent such as ether or ethyl acetate and a high boiling substance such as anisole, phenetole, benzyl acetate or benzyl benzoate, the ether, ethyl acetate or the like may first be removed by distillation, acetic acid then being distilled from the residue leaving the high boiling ether or ester as a tail product. The distillation operations are advantageously effected in distillation columns which may be provided with reflux means in the well known manner in order to maintain the upper plates of the column charged with liquid of substantially the composition of the vapours leaving the column.

If desired the extract may be freed from any water which it may contain prior to or during the separation of the concentrated acid by distillation or otherwise. Such removal may be effected for instance by treatment with dehydrating agents such as anhydrous sodium sulphate or the like. Preferably however any water contained in the extract is removed, either during the distillation of the extract or in a separate operation, as an azeotropic mixture with one of the components of the extracting medium or with a suitable added substance. Thus, for instance, where the extracting medium contains ethyl acetate, the latter may carry away any water present as an azeotropic mixture during the distillation. If the proportion of water present is greater than that which can be carried away by the ethyl acetate present, the ethyl acetate layer of the condensate may be returned to a suitable point in the distillation apparatus in such proportion as to effect a complete or substantially complete removal of the water. If desired however, after distilling off any or all of the components of the extracting medium, water if present may be removed by distillation with a suitable substance forming an azeotropic mixture with water. Thus, where the extracting medium consists of ether and, say, anisole or phenetole, the ether may first be distilled off and the mixture of acetic acid and anisole or phenetole dehydrated by distillation with benzene, ethylene chloride or other suitable liquid in a distillation column. The anhydrous acetic acid may then be separated from the anisole by a further distilling operation.

The invention is of particular importance and has been described principally with reference to the production of concentrated acetic acid. It may however be applied to the production of other concentrated lower aliphatic acids, for example propionic or butyric acid.

What I claim and desire to secure by Letters Patent is:—

1. Process for the concentration of an aqueous solution of a lower aliphatic acid, which comprises forming from the aqueous solution an extract containing the aliphatic acid, an oxygen-containing organic compound substantially immiscible with water, and a solvent for the aliphatic acid which is of lower boiling point than the acid and which dissolves some water.

2. Process for the concentration of an aqueous solution of acetic acid, which comprises forming from the aqueous solution an extract containing the acetic acid, an oxygen-containing organic compound substantially immiscible with water, and a solvent for the acetic acid which is of lower boiling point than the acid and which dissolves some water.

3. Process for the concentration of an aqueous solution of a lower aliphatic acid, which comprises extracting the aqueous solution with a medium containing an oxygen-containing organic compound substantially immiscible with water and a solvent for the aliphatic acid which is of lower boiling point than the acid and which dissolves some water.

4. Process for the concentration of an aqueous solution of acetic acid, which comprises extracting the aqueous solution with a medium containing an oxygen-containing organic compound substantially immiscible with water and a solvent for the acetic acid which is of lower boiling point than the acid and which dissolves some water.

5. Process for the concentration of an aqueous solution of a lower aliphatic acid, which comprises extracting the aqueous solution with a medium containing a solvent for the aliphatic acid which is of lower boiling point than the acid and which solvent dissolves some water, and thereafter separating water from the extract by adding thereto an oxygen-containing organic compound substantially immiscible with water.

6. Process for the concentration of an aqueous solution of acetic acid which comprises extracting the aqueous solution with a medium containing a solvent for the acetic acid which is of lower boiling point than the acid and which solvent dissolves some water, and thereafter separating water from the extract by adding thereto an oxygen-containing organic compound substantially immiscible with water.

7. Process for the concentration of aqueous solutions of acetic acid, which comprises extracting the aqueous solutions with a medium containing a solvent for the acetic acid of lower boiling point than the acid and an oxygen-containing organic compound substantially immiscible with water of a higher boiling point than the acid.

8. Process for the concentration of aqueous solutions of lower aliphatic acids, which comprises forming from the aqueous solution an extract containing the aliphatic acid, a solvent for the aliphatic acid of lower boiling point than the acid, and in addition an oxygen-containing compound substantially immiscible with water and having a boiling point above 140° C., the ratio of solvent of low boiling point to oxygen-containing compound being between 6:4 and 8:2.

9. Process for the concentration of aqueous solutions of acetic acid, which comprises extracting the aqueous solutions with a medium containing a solvent for the acetic acid of lower boiling point than the acid, and thereafter separating water from the extract by adding thereto an oxygen-containing organic compound substantially immiscible with water and of a higher boiling point than the acid.

10. Process for the concentration of an aqueous solution of acetic acid, which comprises extracting the aqueous solution with a medium containing an oxygen-containing organic compound substantially immiscible with water and a solvent for the acetic acid which is of lower boiling point than the acid and which dissolves some water, the solvent being of such a nature that it forms with water an azeotropic mixture of minimum boiling point.

11. Process for the concentration of an aqueous solution of acetic acid, which comprises extracting the aqueous solution with a medium containing a solvent for the acetic acid which is of lower boiling point than the acid and which solvent dissolves some water, the solvent being of such a nature that it forms with water an azeotropic mixture of minimum boiling point, and thereafter separating water from the extract by adding thereto an oxygen-containing organic compound substantially immiscible with water.

12. Process for the concentration of an aqueous solution of acetic acid, which comprises extracting the aqueous solution with a medium containing an oxygen-containing organic compound substantially immiscible with water and a solvent for the acetic acid which is of lower boiling point than the acid, which solvent dissolves some water and is selected from the group consisting of ethers and esters.

13. Process for the concentration of an aqueous solution of acetic acid, which comprises extracting the aqueous solution with a medium containing an organic compound substantially immiscible with water and selected from the group consisting of ethers and esters, said medium also containing a solvent for the acetic acid which is of lower boiling point than the acid and which dissolves some water.

14. Process for the concentration of an aqueous solution of acetic acid, which comprises extracting the aqueous solution with a medium containing a solvent for the acetic acid which is of lower boiling point than the acid, which solvent dissolves some water and is selected from the group consisting of ethers and esters, and thereafter separating water from the extract by adding thereto an oxygen-containing organic compound substantially immiscible with water.

15. Process for the concentration of an aqueous solution of acetic acid, which comprises extracting the aqueous solution with a medium containing a solvent for the acetic acid which is of lower boiling point than the acid, which solvent dissolves some water, and thereafter separating water from the extract by adding thereto an oxygen-containing organic compound substantially immiscible with water and selected from the group consisting of ethers and esters.

16. Process for the concentration of aqueous solutions of acetic acid, which comprises extracting the aqueous solutions with a medium containing an alkyl acetate and an alkyl aryl ether.

17. Process for the concentration of aqueous solutions of acetic acid, which comprises extracting the aqueous solutions with a medium containing an alkyl acetate, and thereafter separating water from the extract by adding thereto an alkyl aryl ether.

18. Process for the concentration of aqueous solutions of acetic acid of 10–40% strength, which comprises extracting the aqueous solutions with a medium containing ethyl acetate and phenetole.

19. Process for the concentration of aqueous solutions of acetic acid of 10–40% strength, which comprises extracting the aqueous solutions with a medium containing ethyl acetate, and thereafter separating water from the extract by adding phenetole thereto.

HENRY DREYFUS.